July 21, 1959 C. B. FRELLSEN 2,895,591
HYDRAULIC CONVEYOR SWING AND TAKE-UP

Filed May 27, 1958 2 Sheets-Sheet 1

INVENTOR.
CARLTON B. FRELLSEN

BY *Charles F. Osgood*,

ATTORNEY

July 21, 1959 C. B. FRELLSEN 2,895,591
HYDRAULIC CONVEYOR SWING AND TAKE-UP
Filed May 27, 1958 2 Sheets-Sheet 2
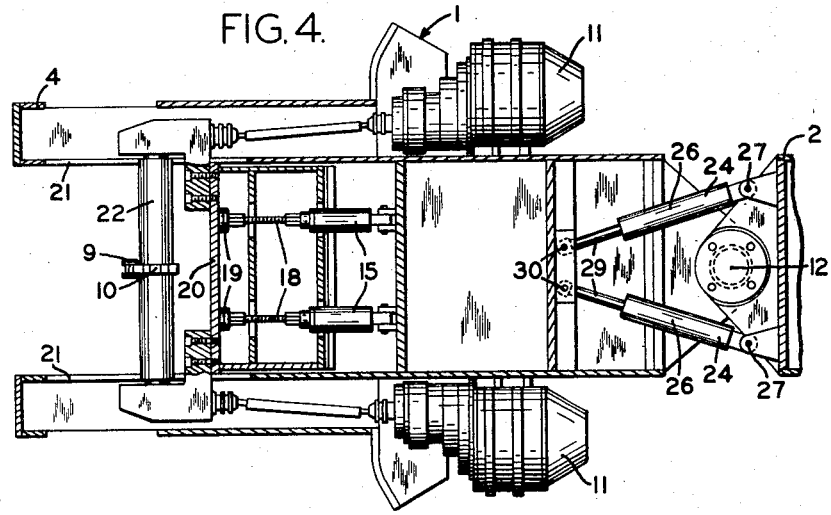
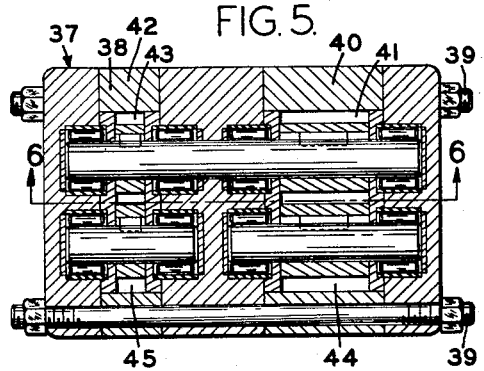
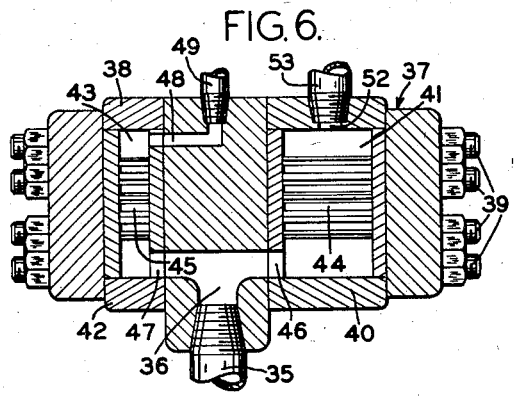
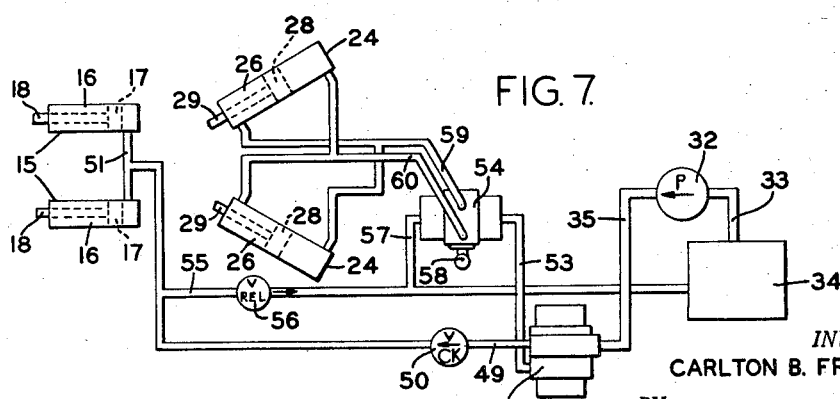
INVENTOR.
CARLTON B. FRELLSEN
ATTORNEY.

United States Patent Office 2,895,591
Patented July 21, 1959

2,895,591

HYDRAULIC CONVEYOR SWING AND TAKE-UP

Carlton B. Frellsen, Franklin, Pa., assignor to Joy Manufacturing Company, Pittsburgh, Pa., a corporation of Pennsylvania Application May 27, 1958, Serial No. 738,125

6 Claims. (Cl. 198—109)

This invention relates to conveyors and more particularly to endless chain flight conveyors especially designed for use with mobile loading machines whereby when the swingable end portion of the conveyor is swung laterally any slack introduced into the conveyor chain is automatically taken up.

The present invention is an improvement over the hydraulic conveyor take-up disclosed in a copending application Serial No. 413,120, filed March 1, 1954, now Patent No. 2,856,061, assigned to the assignee of the present invention. The present invention contemplates improvements over the earlier design in that the structure is simplified and efficiency is increased while retaining the desired flexibility and durability.

An object of the present invention is to provide an improved fluid operated take-up for an endless chain flight conveyor for automatically taking up any slack introduced into the conveyor chain as the swingable end portion of the conveyor is swung laterally. Another object is to provide an improved fluid take-up and swinging means for a conveyor embodying a flow divider whereby the fluid is divided exactly as desired between the take-up and swinging devices. Other objects and advantages of the invention will, however, hereinafter more fully appear.

In the accompanying drawings there is shown for purposes of illustration one form which the invention may assume in practice.

In these drawings

Fig. 4 is a horizontal section, on a reduced scale, taken on line 4—4 of Fig. 3.

Fig. 5 is an axial vertical section through the flow divider.

Fig. 6 is a horizontal section taken on line 6—6 of Fig. 5.

Fig. 7 is a diagrammatic view of the hydraulic fluid system.

Figure 2:
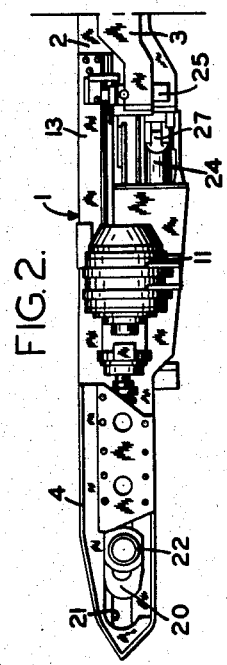
Fig. 2 is a side view of the conveyor shown in Fig. 1.
Figure 3:
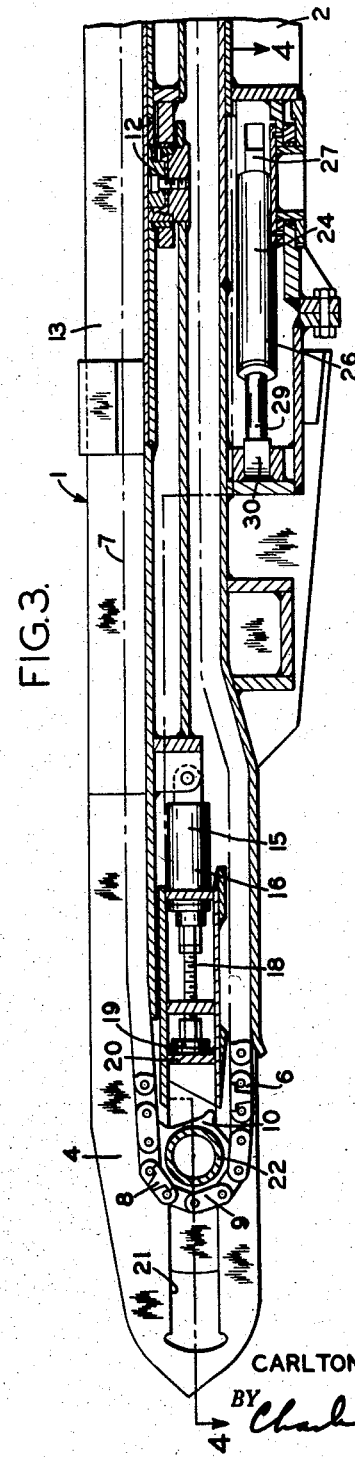
Fig. 3 is an enlarged central longitudinal vertical section taken on line 3—3 of Fig. 1, showing details of the take-up and swinging cylinder devices.
Figure 1:
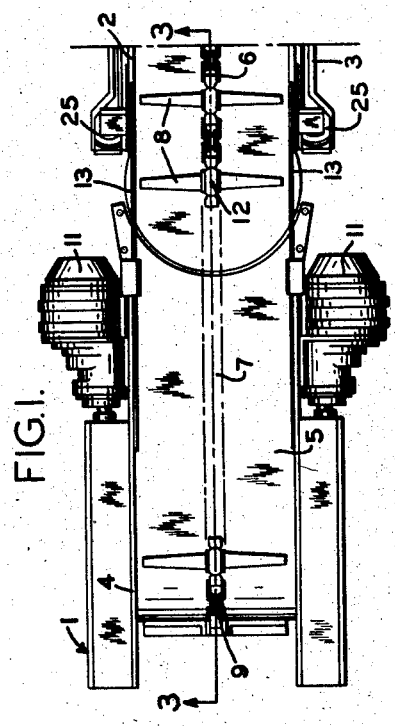
Fig. 1 is a fragmentary plan view of a conveyor in which an illustrative form of the invention is embodied.

In the illustrative construction as shown in the drawings the improved conveyor swing and take-up are shown embodied in a conveyor mechanism generally designated 1. This conveyor mechanism is of the endless chain flight type and comprises a forward troughlike frame 2 which extends forwardly along the frame 3 of the loading machine and a rearward troughlike frame 4 cooperates with the forward troughlike frame to provide a longitudinal troughlike passageway 5 in which an endless conveyor chain 6 is guided for orbital circulation. The top run 7 of the conveyor chain moves along the bottom of the roughlike passageway and has lateral conveyor flights 8 attached to a central drive chain 9 of the universally flexible type. The conveyor chain passes around a drive sprocket 10 at the rearward portion of the rear conveyor frame 4 and this sprocket is driven by motors 11 to effect drive of the endless conveyor. The rearward troughlike frame 4 is pivotally mounted on the rearward portion of the forward troughlike frame 2 to swing laterally about an upright axis 12. Arranged vertically at the sides of the pivot 12 are flexible side portions 13 which provide continuations of the sides of the troughlike conveyor frames 2 and 4 and these side plates are adapted to flex or bend laterally as the rear conveyor frame 4 is swung laterally about its pivot 12 and as these plates flex or bend the conveyor chain 6 has slack introduced therein which must be taken up to provide for proper tension of the conveyor during its operation. The loading machine with which the conveyor of the present invention is associated may be of the same general type as that shown in a copending application Serial No. 644,067, filed March 5, 1957, owned by the same assignee as the present invention.

In accordance with the present invention, arranged longitudinally at opposite sides of the rear portion of the rear swingable conveyor frame 4 are fluid jacks 15 comprising cylinders 16 containing reciprocal pistons 17 having piston rods 18 projecting rearwardly from the rear cylinder heads. These piston rods are connected at 19 to a transverse frame 20 guided for longitudinal movement along longitudinal guideways 21 formed in the rearward portion of the rear conveyor frame 4. When liquid under pressure is supplied to the inner ends of the jack cylinders 16 the pistons 17 are moved rearwardly moving the transverse frame 20 rearwardly along the guideways 21 thereby to move the transverse drive shaft 22 for the conveyor drive sprocket 10 rearwardly to take up any slack in the conveyor chain 6 to maintain the desired chain tension. When liquid is vented from the jack cylinders the pistons may retract to relieve the tension on the conveyor chain.

Fluid jacks 24 are provided for swinging the rear conveyor frame 4 and the rearward portion of the conveyor frame may be tilted by fluid jacks 25 to tilt the rearward frame portion 4 in vertical planes relative to the forward frame portion 2 in the manner conventional in conveyors of the type disclosed. The swing jacks 24 comprise fluid cylinders 26 pivotally mounted at 27 on the forward conveyor frame to swing laterally relative thereto and pistons 28 contained in the cylinders and rearwardly extending piston rods 29 pivotally connected at 30 to the swingable rearward conveyor frame 4. When liquid under pressure is supplied respectively to the opposite ends of the swing cylinders 24 the pistons are moved in relatively opposite directions to swing the rearward conveyor frame 4 laterally about its pivot 12 and when liquid is trapped in the swing cylinders the rearward conveyor frame may be held in its adjusted position.

Now referring to the hydraulic fluid system shown diagrammatically in Fig. 7, it will be noted that a conventional motor driven pump 32 has its suction side connected by a conduit 33 to a liquid reservoir or tank 34 and the discharge side of the pump is connected by a conduit 35 to the intake passage 36 of a conventional flow divider generally designated 37. This flow divider has a casing 38 made up of a number of sections held in assembled relation by bolts 39 and a section 40 provides a large capacity fluid chamber 41 while a section 42 provides a chamber 43 of relatively small capacity. The chamber 41 contains a gear or intermeshing rotor pump 44 comprising a pair of intermeshing gears while the small capacity chamber 43 contains a similar gear or intermeshing rotor pump 45. Each gear-pump is in effect a motor-pump device comprising intermeshing spur gears, as is well known to those skilled in the hydraulic art, and at times one or the other of the motor-pump device comprising intermeshing spur gears, as is well known to those skilled in the hydraulic art, and at times one or the other of the motor-pumps will act as a motor and cause the other motor-pump to act as a booster pump for taking in fluid at a certain pressure and discharging fluid at a higher pressure. The intake passage 36 of the flow divider has oppositely extending lateral ports 46 and 47 communicating with the large and small capacity chambers 41 and 43 of the motor-pumps. The small capacity pump chamber has a discharge passage 48 connected by a conduit 49 having a check valve 50 to a branched conduit 51 leading to the inner ends of the take-up cylinders 16. The large gear chamber is connected by a discharge passage 52 to a conduit 53 leading to a conventional valve box 54. The conduit 49 leading to the take-up cylinders has a return conduit 55 having a relief valve 56 and leading back to the liquid tank 34 and the valve box 54 has a return conduit 57 communicating with the return conduit 55. The valve box has a bore containing a conventional manually shiftable control valve 58 and the valve receiving bore is connected by conduits 59 and 60 respectively leading to the opposite ends of the swing cylinders 26. In this particular mechanism the pump discharge has a volume of substantially sixteen gallons per minute and the motor-pumps of the flow divider are so designed that the large capacity pump delivers substantially twelve gallons to the conduit 53 to the valve box 54 while the small capacity pump delivers substantially four gallons of liquid pressure to the conveyor chain take-up cylinders. Evidently the volume ratio may be varied to suit different operating conditions. It will thus be seen that during running of the pump liquid under pressure is constantly supplied through conduit 49 to the take-up cylinders and through conduit 53 to the valve box and under the control of the manually shiftable valve 58 liquid under pressure may be supplied to the swing cylinders 26 to effect swing of the conveyor laterally in one direction or the other. By properly positioning the shiftable control valve 58 liquid may be trapped within the swing cylinders to maintain the conveyor in its desired adjusted position. In the event the pressure in the take-up cylinders becomes excessive the relief valve 56 automatically opens to discharge some of the liquid pressure back to the tank and in the event the pump pressure should drop for any reason the check valve 50 will automatically trap the liquid within the take-up cylinders to maintain the chain tension.

As a result of this invention an improved conveyor of the endless chain flight type is provided wherein proper tension of the conveyor chain is maintained during lateral swing of the rear discharge portion of the conveyor. Further, by the provision of the automatic take-up any slack introduced into the conveyor chain during lateral swing of the swingable end portion of the conveyor may be automatically taken up by improved fluid take-up means operatively associated with the conveyor swinging means. The improved hydraulic take-up is operatively associated with the conveyor swinging means and embodies improved control means embodying a flow divider whereby tensioning of the conveyor chain is not only effected efficiently but also relatively smoothly and in a simple and reliable manner. These and other advantages of the invention will be clearly apparent to those skilled in the art.

While there is in this application specifically described on form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a conveyor mechanism having a laterally swingable end portion and an endless conveyor guided thereon, fluid operated means for swinging said end portion laterally, fluid operated take-up means connected to said conveyor for automatically taking up any slack introduced therein as said conveyor is swung laterally, and means for supplying fluid under pressure to said swinging means and said take-up means comprising a fluid pump having a discharge and a flow divider having a relatively large capacity discharge and a relatively small capacity discharge for dividing the flow from said pump discharge respectively to said swinging means and said take-up means whereby a relatively larger quantity of pressure fluid is supplied to said swinging means than to said take-up means.

2. A conveyor mechanism as set forth in claim 1 wherein said flow divider comprises a pair of motor-pump devices connected to turn together and of relative different capacities, one of said devices having a relatively large capacity discharge and the other of said devices having a relatively small capacity discharge.

3. A conveyor mechanism as set forth in claim 2 wherein said relatively large capacity discharge of said flow divider is connected to said swinging means and said relatively small capacity discharge is connected to said take-up means, and conduit means is provided for conducting pressure fluid from said small capacity discharge to said take-up means and has a check valve means for permitting fluid flow through said conduit only toward said take-up means and for automatically preventing reverse flow.

4. A conveyor mechanism as set forth in claim 3 wherein said flow divider has a conduit for conducting pressure fluid from said large capacity discharge of said flow divider to said swinging means, said latter conduit leading to a shiftable control valve device for regulating fluid flow to said swinging means to operate the latter to effect conveyor swing in either of opposite directions.

5. In a conveyor mechanism having a laterally swingable end portion and an endless conveyor guided thereon, a pair of fluid swing jacks for swinging said end portion laterally, a pair of fluid take-up jacks for said conveyor for automatically taking up any slack introduced in said conveyor as the latter is swung laterally, means for supplying fluid under pressure to said swing jacks and said take-up jacks comprising a fluid pump having a discharge, and a flow divider for dividing the flow from said pump discharge to said swing jacks and said take-up jacks whereby a relatively smaller quantity of fluid flows to said take-up jacks than to said swing jacks, said flow divider comprising a pair of motor-pump devices of relatively different capacity connected to turn together and each having a fluid discharge and conduit means for connecting said fluid discharges of said flow divider respectively to said swing jacks and said take-up jacks.

6. In a conveyor mechanism having a laterally swingable end portion and an endless conveyor guided thereon, fluid operated means for swinging said end portion laterally in either direction including relatively oppositely acting swing cylinders, a shiftable control means for supplying pressure fluid to said swing cylinders, fluid operated take-up cylinders acting on said endless conveyor for automatically taking up any slack introduced therein as said conveyor is swung laterally, a source of fluid supply and means for conducting pressure fluid to said swing cylinders and said take-up cylinders comprising a fluid pump and a flow divider having relatively large and relatively small capacity discharges leading respectively to said swing cylinders and said take-up cylinders.

No references cited.